March 13, 1956 L. DE WITTE 2,737,810
ELECTRICAL RESISTANCE THERMOMETER
Filed Dec. 9, 1953

INVENTOR.
LEENDERT de WITTE
BY
Oberlin & Limbach
ATTORNEYS.

United States Patent Office 2,737,810
Patented Mar. 13, 1956

2,737,810

ELECTRICAL RESISTANCE THERMOMETER

Leendert De Witte, Ponca City, Okla., assignor to Continental Oil Company, Ponca City, Okla., a corporation of Delaware Application December 9, 1953, Serial No. 397,121

3 Claims. (Cl. 73—362)

This invention relates to temperature measuring devices and particularly to thermometers or pyrometers of the so-called resistance type.

Resistance thermometers used heretofore have generally employed a metallic conductor in the form of a wire which varies in electrical conductivity or resistance as its temperature varies. By exposing a wire to heat from a substance, the temperature of which is to be measured, and measuring the electrical resistance of the wire the temperature of the substance can be determined. The change of resistance per degree change in temperature is very small, so to determine accurately small variations in temperature, exceptionally accurate, and therefore expensive, resistance measuring devices must be employed. Other types of resistance thermometers are those employing a liquid conductor or electrolyte as the resistance element. The liquid resistance thermometer while overcoming many of the disadvantages of those employing a metallic resistance still show certain disadvantages mainly because a direct current of electricity is used. With a direct current in the case of a two electrode system, the electrodes become polarized thus producing inaccurate readings. A two electrode system using an alternating current is not entirely free from polarization and electrolytic corrosion effects.

I have now discovered that the foregoing objections can be overcome by employing an alternating current of electricity and a resistance detection system using four electrodes in a liquid conductance cell. Such an installation has a very wide variation in resistance per degree change in temperature, and within given reasonable temperature ranges can be made to read temperatures exceptionally accurately with relatively inexpensive resistance measuring devices.

It is accordingly an object of the present invention to provide a temperature indicating device which overcomes the disadvantages above mentioned and yet which is inexpensive in construction, simple to manufacture, positive in operation, and substantially unaffected by polarizing conditions. Another object of the invention is the provision of employing electrical resistance thermometers which may be used for the following purposes:

1. Surveying temperature conditions in well bores, and
2. Detection of temperature changes or level in all types of installations and equipment where the temperature is to be recorded at a remote point.

The foregoing objects will be more fully apparent together with other objects from a consideration of the following discussion made in connection with the accompanying drawings. It is to be expressly understood, however, that these drawings are for the purposes of illustration only and are not intended to define the limits of my invention. Referring to the illustrations:

Figure 1:
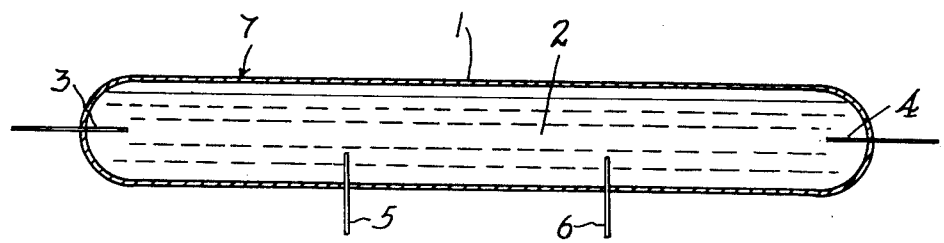
Figure 1 is a cross-sectional view of the electrical resistance element.

Briefly, the resistance element 7 shown in Figure 1 consists of a container 1, two electrical current terminals or electrodes 3 and 4, an electrically conductive liquid 2 or resistance as it may be termed, and two pickup electrodes 5 and 6. The container may be of glass or other suitable liquid tight insulating material. A certain potential drop exists across pickup electrodes 5 and 6 when an alternating current of electricity flows through resistance element 7. Now since the electrical resistance of a given resistance element is a function of temperature and since the potential drop across the pickup electrodes varies directly as the electrical resistance of element 7, it follows that a determination of the potential drop across electrodes 5 and 6 can be used as a measure of temperature.

The conductor is filled nearly to the top with the liquid conductor 2. Suitable liquids include the slightly conducting polar organic compounds of the type of alcohols, ketones, glycols, glycol ethers, polyglycol ethers, sulfones, esters, or other polar organic compounds of the type mentioned. Since most of the organic compounds of the type mentioned are characteristically of low electrical conductivity, it is usually desirable to add an electrolyte to such compounds to improve their conductivity characteristic. Therefore, the liquids which have been found to be most satisfactory in use for the purpose of the liquid conductor preferably comprise a polar organic compound of the type mentioned in combination with an organic or inorganic electrolyte which is soluble to a sufficient extent in the liquid.

More specific examples of polar organic compounds of the type mentioned, which have been found to be satisfactory for use as the liquid conductor, include the following: ethyl alcohol, methyl alcohol, propyl alcohol, butyl alcohol, ethylene glycol, diethylene glycol, propylene glycol, hexaethylene glycol, tetraethylene glycol, and other polyethylene glycols, methoxy-methoxy ethanol; ethylene glycol monobutyl ether having the formula $C_4H_9OCH_2CH_2OH$ as for example embodied in the commercial product marketed under the trade name "Butyl Cellosolve"; acetone; ethylene glycol monoethyl ether having the formula $C_2H_5OCH_2CH_2OH$ as for example embodied in the commercial product marketed under the trade name "Cellosolve."

Electrolytes which have been found satisfactory for use with liquid organic compounds of the types above mentioned include ammonium phosphate, potassium phosphate, ethanolamine phosphates, amyl, diamyl, and triamyl amines, triethanolamine phosphate, butyl amine phosphates, sulfates, chlorides and salts of organic acids. By using varying quantities of the free acid corresponding to the anion used it is possible to adjust the pH value and consequently to control the hydrogen ion activity to achieve a desired conductivity. Instead of the electrolytes mentioned, small quantities of water added to the polar organic solution have been found to improve the operating characteristics of the same by increasing the conductivity thereof; or water, together with one of the electrolytes mentioned may be added to the polar organic compound or compounds.

Especially desirable electrolytes for addition to the polar organic compound include phosphoric acid and salts of phosphoric acid, since in the use of the latter electrolytes relatively little corrosion is encountered and good stability obtained over a wide temperature range. The concentration of the electrolyte may vary widely, but in general it may be stated that a concentration of electrolyte comprising 0.01 per cent to five per cent by weight of the liquid conductor has been found to be satisfactory. The two current terminals or electrodes 3 and 4 are preferably of platinum or platinized metals. Electrodes 5 and 6 are also preferably platinum or platinized metals.

Figure 2:
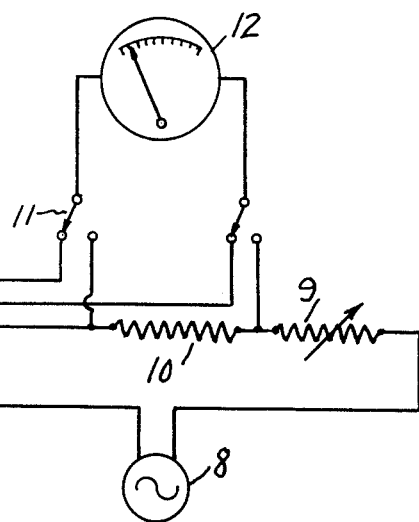
Figure 2 is a diagram showing the connection of the resistance element in the measuring circuit.
Figure 2:
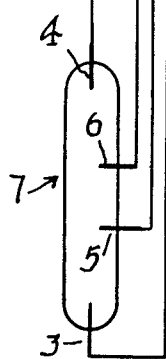

Figure 2 shows one form of circuit which may be used for temperature determinations, in which 7 is the resistance element described above and shown in Figure 1, 8 is a source of alternating current, 9 is a variable resistor, 10 is a standard precision resistor, 11 is a selector switch which permits the current flowing in the resistance element 7 to be read on the milliampere scale of the indicating instrument 12 and whereby the potential difference across electrodes 5 and 6 as a function of temperature may be read on the indicating instrument 12.

The resistance element can be calibrated by immersing it in known constant temperature baths such as melting ice, boiling water, etc., and determining the resistance at the known temperature. By determining a number of such values a curve can be plotted from which any unknown temperature can be found. It is only necessary to permit the resistance element to reach the temperature of the unknown substance, read the corresponding potential difference across the pickup electrodes at that temperature, and in case the meter is not calibrated to temperature reading, find the temperature on the curve.

It will be evident to a person skilled in the art that variation in the physical configuration of the structure disclosed, will vary the resistance characteristics of the resistance element. Increasing the distance between electrodes 5 and 6 will cause an increase in the apparent resistance of the conduction liquid and consequently increase the potential difference while decreasing the electrode distance will cause a corresponding decrease in the potential difference.

A specific example of the invention which has produced excellent results within normal temperature ranges (50 to 175° F.), is as follows: The container 1 was a glass tube 3 cm. long and ½ cm. in diameter. Electrodes 3, 4, 5, and 6 were 24 gauge platinum wire. The liquid conductor 2 was an 0.1 normal solution of sodium chloride in water. Sufficient sodium chloride solution was placed in the container to immerse the electrodes completely.

The resistance element had resistance values at the indicated temperatures when a current of 1 milliampere was passed through it as follows:

| Temperature, °F. | Resistivity of Electrolyte in ohm Meters | Resistance Between Electrodes 5 and 6 in ohms | Potential Drop Across Electrodes 5 and 6 |
|---|---|---|---|
| 50 | 1.51 | 769 | 0.769 |
| 75 | 0.96 | 489 | 0.489 |
| 100 | 0.74 | 377 | 0.377 |
| 125 | 0.598 | 304 | 0.304 |
| 150 | 0.477 | 243 | 0.243 |
| 175 | 0.403 | 205 | 0.205 |

It will thus be seen from the foregoing that the present invention forms a simple, inexpensive, and accurate resistance thermometer which may be easily made and calibrated. It is extremely accurate due to its wide variations in its resistance per degree change in temperature.

What is considered new and inventive is defined in the hereunto appended claims, it being, of course, understood that equivalents known to those skilled in the art are to be construed as within the scope and purview of the claims.

Accordingly, applicant claims:

1. An electrical resistance thermometer comprising an alternating current source, a current responsive indicating instrument, an electrically insulating heat conductive container, the ends of said container being provided with electrical terminals, an electrically conductive liquid in said container adapted to vary in electrical conductivity with variations in the temperature thereof, two electrically separated electrodes having portions thereof within said container and located between said electrical terminals, and means for measuring the drop in potential across said two electrodes when an alternating current flows through said electrical terminals and said conductive liquid.

2. An electrical resistance thermometer as defined in claim 1 wherein the electrically conductive liquid comprises a polar organic compound.

3. An electrical resistance thermometer as defined in claim 1 wherein the electrically conductive liquid comprises a solution of an electrolyte.

References Cited in the file of this patent

UNITED STATES PATENTS

| 880,273 | Bristol | Feb. 25, 1908 |
| 2,049,285 | Bauer | July 28, 1936 |
| 2,375,892 | Bouyoucos | May 15, 1945 |

FOREIGN PATENTS

| 762,788 | France | Apr. 18, 1934 |

OTHER REFERENCES

Electrolytic Thermistor, F. Gutman, published in The Review of Scientific Instruments, vol. 20, No. 9, Sept. 1949, pp. 674, 675.